US006466422B2

(12) United States Patent
Luo

(10) Patent No.: US 6,466,422 B2
(45) Date of Patent: Oct. 15, 2002

(54) CURRENT LIMIT PROTECTION CIRCUIT FOR A VOLTAGE REGULATOR

(75) Inventor: Wen Li Luo, Shenzhen (CN)

(73) Assignee: Shenzhen STS Microelectronics Co., Ltd. (CN)

( * ) Notice: Subject to any disclaimer, the term of this patent is extended or adjusted under 35 U.S.C. 154(b) by 0 days.

(21) Appl. No.: 10/039,043

(22) Filed: Dec. 31, 2001

(65) Prior Publication Data

US 2002/0118002 A1 Aug. 29, 2002

(30) Foreign Application Priority Data

Jan. 2, 2001 (CN) ........................................ 01101215 A

(51) Int. Cl.[7] .................................................. H02H 7/00
(52) U.S. Cl. ........................................ 361/18; 361/93.9
(58) Field of Search ........................ 361/18, 93.1, 93.9, 361/87, 78; 323/907

(56) References Cited

U.S. PATENT DOCUMENTS 5,570,060 A 10/1996 Edwards ..................... 327/541
5,666,044 A 9/1997 Tuozzolo .................... 323/277
5,838,524 A * 11/1998 Phillips ....................... 361/18
6,141,193 A * 10/2000 Mercer ........................ 361/18

* cited by examiner

*Primary Examiner*—Shawn Riley
(74) *Attorney, Agent, or Firm*—Lisa K. Jorgenson; Christopher F. Regan

(57) ABSTRACT

A voltage regulator includes a power transistor receiving a drive current, and a current limit protection circuit connected to the power transistor. The current limit protection circuit includes a first resistance connected to the power transistor for sensing an output current, a limit switch transistor connected to the power transistor and to the first resistance, and a current generator and second resistance connected thereto. The current generator and second resistance biases the limit switch transistor to divert drive current from the power transistor based upon the output current through the first resistance exceeding a threshold. The first resistance has a value less than a value of the second resistance. The first resistance can be made considerably smaller than otherwise to thereby reduce power consumption. The temperature coefficient for the second resistance is balanced with respect to a temperature coefficient for the first resistance so that a output current from the voltage regulator is not sensitive to temperature variations.

42 Claims, 4 Drawing Sheets

CURRENT LIMIT PROTECTION CIRCUIT FOR A VOLTAGE REGULATOR

FIELD OF THE INVENTION

The present invention relates to the field of power devices, and, more particularly, to a current limit protection circuit for limiting output current from a voltage regulator or other similar circuit.

BACKGROUND OF THE INVENTION

Voltage regulators are designed to provide a constant voltage over a variety of load impedances. As the impedance of the load increases, the voltage regulator requires less output current to keep the load at a constant voltage. Conversely, as the impedance of the load decreases, more current is required to maintain a same constant voltage. When the output current required to maintain a constant voltage is greater than the safe operating condition of the power transistor of the voltage regulator, a current limit protection circuit is required to limit the output current.

A voltage regulator 10 with a current limit protection circuit 12 according to the prior art is illustrated in FIG. 1. The voltage regulator 10 includes an error amplifier 14 having a non-inverting input receiving a reference voltage Vref, which corresponds to the desired output voltage Vout of the voltage regulator 10. An inverting input of the error amplifier 14 is connected to an output terminal 16 of the voltage regulator 10. This connection between the error amplifier 14 and the output terminal 16 forms a negative feedback loop for stabilizing the output voltage Vout.

The error amplifier 14 drives the control terminal of the power transistor 18 proportional to the amount of current necessary to maintain the output voltage Vout at the reference voltage Vref. If the output voltage Vout begins to fall below the reference voltage Vref, the output of the error amplifier 14 increases the voltage for the control terminal of the power transistor 18, thereby driving more current to the output terminal 16, which in turn raises the output voltage Vout.

The current limit protection circuit 12 illustrated in FIG. 1 includes a limit switch transistor 20 and a current sense resistance 22. The current sense resistance 22 is typically a very low resistance resistor which can handle large currents of the power transistor 18. As the current through the power transistor 18 and the current sense resistance 22 increases, the voltage drop across current sense resistance likewise increases. The resistance of the current sense resistance 22 may be selected so that the limit switch transistor 20 turns on when the current reaches an unsafe level.

As the load current increases, the voltage drop across the current sense resistance 22 causes the limit switch transistor 20 to conduct. Bias current Ib from a current source 24 connected to the first conduction terminal of the limit switch transistor 20 shunts away available drive current Id for the power transistor 18. This limits the output current Iout.

As the output load increases, the drive current Id for the power transistor 18 decreases. The characteristics of the current source 24, power transistor 18, and limit switch transistor 20 may be selected to limit the maximum output current Iout that can be delivered by the power transistor 18 to a load. The limit switch transistor 20 and the current sense resistance 22 thus limit the output current Iout in the power transistor 18 during an over-current condition by controlling the drive current Id to the power transistor 18.

To illustrate operation of the current limit protection circuit 12, the safe operating current of the power transistor 18 may be limited to 1 amp and the limit switch transistor 20 may be forward biased at about 0.7 volts. A resistance of the current sense resistance is about 0.7 ohms (i.e., 0.7 volts/1 amp).

A resistance of about 0.7 ohms would be required from the current limit protection circuit 12 for limiting the output current Iout to 1 amp. At 1 amp, the voltage across the current sense resistance 22 is about 0.7 volts. The limit switch transistor 20 thus begins to shunt the current Id from the control terminal of the power transistor 18 so that it is the same as the operating output current Iout.

Even though the current limit protection circuit 12 provides a constant voltage over a variety of load impedances, the voltage regulator disclosed in FIG. 1 has two drawbacks. First, the current sense resistance 22 dissipates a significant amount of power. If the output current Iout is 1 amp, then the resistance of the current sense resistance 22 will consume 0.7 watts, for example.

Second, the output current Iout is sensitive to temperature variations. For example, assume that the limit switch transistor 20 has a negative temperature coefficient Tcf of −2 mV/° C., and the current sense resistance 22 has a positive temperature coefficient Tcf of several thousand ppm/° C. If the temperature increases to 100° C., the voltage applied to the control terminal of the power transistor 18 decreases from 0.7 V to 0.55 V, and the resistance of the current sense resistance 22 increases. Consequently, the output current Iout drops from 1 amp to 0.8 amps.

SUMMARY OF THE INVENTION

In view of the foregoing background, it is an object of the present invention to minimize power dissipation of a current sense resistance used to sense an output current from a voltage regulator.

Another object of the present invention is to limit output current from a voltage regulator so that the output current is not sensitive to temperature variations.

These and other objects, features and advantages in accordance with the present invention are provided by a voltage regulator comprising a power transistor receiving a drive current, and a current limit protection circuit connected to the power transistor.

The current limit protection circuit preferably comprises a first resistance, i.e., a current sense resistance, connected to the power transistor for sensing an output current, a limit switch transistor connected to the power transistor and to the first resistance, and a current generator and second resistance connected thereto. The current generator and second resistance biases the limit switch transistor to divert drive current from the power transistor based upon the output current through the first resistance exceeding a threshold. The first resistance has a value less than a value of the second resistance. Accordingly, the first resistance can advantageously be made considerably smaller than otherwise to thereby reduce power consumption.

The first resistance preferably has a temperature coefficient less than a temperature coefficient of the second resistance. More particularly, the temperature coefficient for the second resistance is based upon the temperature coefficient for the first temperature coefficient so that the output current is not sensitive to temperature variations. In other words, the second resistance is selected so that a desired temperature coefficient is balanced with respect to the temperature coefficient of the first resistance. This advantageously allows the voltage regulator to have a maximum output current that is not sensitive to temperature variations.

The current generator preferably comprises a current source, and at least one transistor connected to the current source. The at least one transistor preferably comprises first and second transistors connected together. The first transistor includes a first conduction terminal connected to a first voltage reference, and a second conduction terminal connected to the first resistance. The second transistor includes a control terminal connected to a control terminal of the first transistor, a first conduction terminal connected to the first voltage reference and to a control terminal of the limit switch transistor, and a second conduction terminal connected to the second resistance.

The first transistor, the second transistor and the power transistor each preferably comprises an NPN bipolar transistor. The second conduction terminal of the first transistor defines an emitter having a first area, and the second conduction terminal of the second transistor defines an emitter having a second area preferably equal to the first area. The first and second transistors thus have the same emitter area so that respective control voltages have the same variation with temperature.

The current limit control circuit preferably further comprises a third transistor and a fourth transistor connected together. The third transistor preferably includes a first conduction terminal connected to the first voltage reference, and a second conduction terminal connected to the first conduction terminal of the first transistor. The fourth transistor preferably includes a control terminal connected to a control terminal of the third transistor, a first conduction terminal connected to the first voltage reference, and a second conduction terminal connected to the first conduction terminal of the second transistor. The third transistor and the fourth transistor each preferably comprises a PNP bipolar transistor.

Another aspect of the invention relates to a method for limiting output current from a voltage regulator that includes providing a drive current to a power transistor connected to the voltage regulator, sensing the output current using a first resistance connected to the power transistor, and generating a biasing current using a current generator and a second resistance connected thereto. The method preferably further comprises biasing a limit switch transistor connected to the power transistor and the first resistance with the biasing current for diverting the drive current from the power transistor based upon the output current through the first resistance exceeding a threshold.

The first resistance preferably has a value less than a value of the second resistance. Accordingly, the first resistance can advantageously be made considerably smaller than otherwise to thereby reduce power consumption. The first resistance preferably has a temperature coefficient less than a temperature coefficient of the second resistance so that the output current is not sensitive to temperature variations.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. The dimensions of layers and regions may be exaggerated in the figures for greater clarity.

Figure 2:
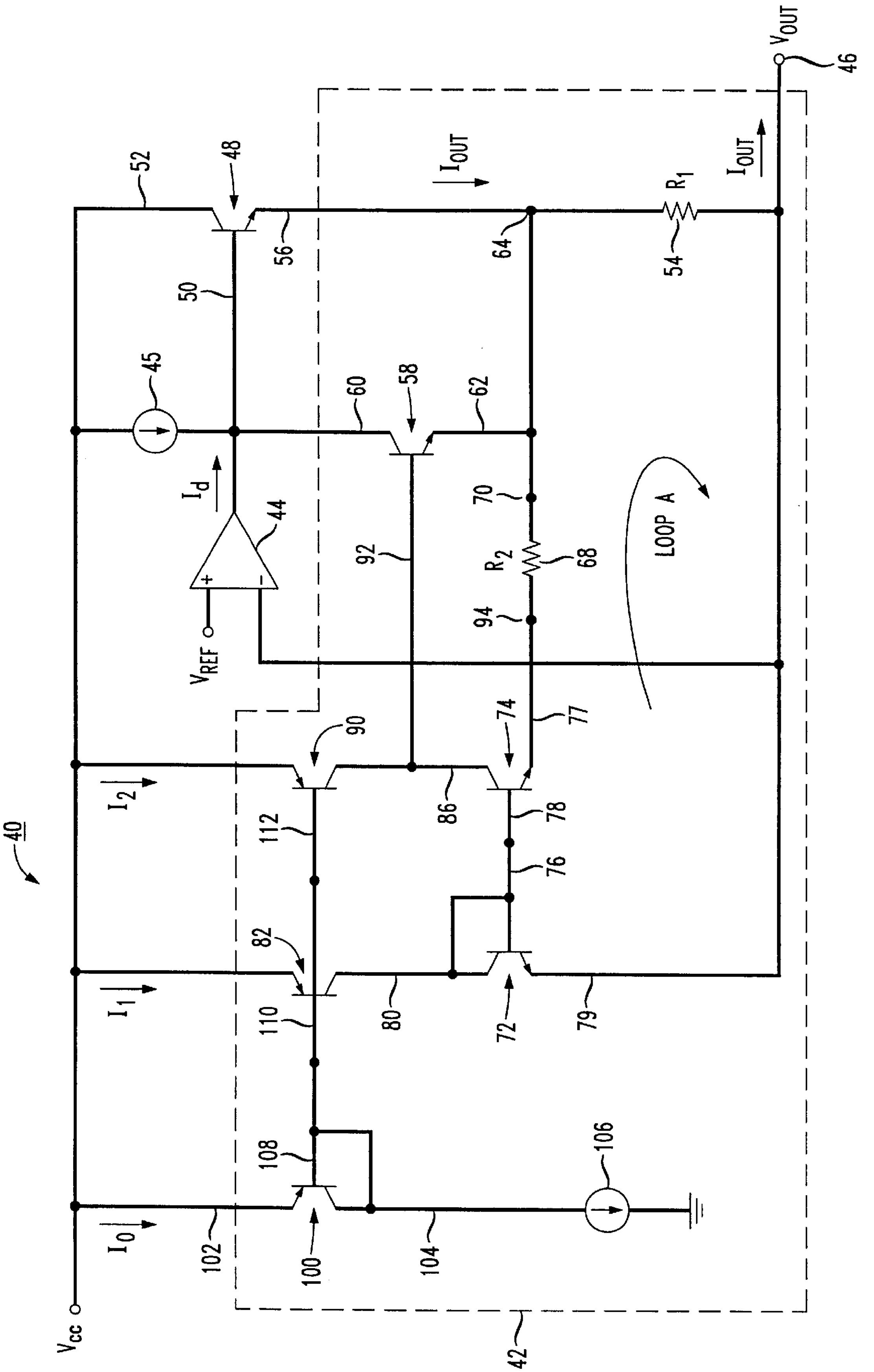
FIG. 2 is a schematic diagram of a current limit protection circuit for a voltage regulator in accordance with the present invention.

Referring initially to FIG. 2, a voltage regulator 40 with a current limit protection circuit 42 in accordance with the present invention will now be described. The voltage regulator 40 includes an error amplifier 44 having a non-inverting input connected to a first voltage reference Vref, which corresponds to a desired output voltage of the voltage regulator. An inverting input of the error amplifier 44 is connected to an output terminal 46 of the voltage regulator 40, which forms a negative feedback loop for stabilizing the output voltage Vout.

A power transistor 48 includes a control terminal 50 connected to an output of the error amplifier 44, and includes a first conduction terminal 52 connected to a second voltage reference Vcc. The current limit protection circuit 42 is connected to the error amplifier 44 and to the power transistor 48 for limiting the output current Iout to a safe operating level. A first current source 45 is connected between the second voltage reference Vcc and the control terminal 50 of the power transistor 48.

The current limit protection circuit 42 comprises a first resistance 54, i.e., a current sense resistance, connected between a second conduction terminal 56 of the power transistor 48, and the output terminal 46 of the voltage regulator 40 for sensing the output current Iout. A limit switch transistor 58 having a first conduction terminal 60 is connected to the control terminal 50 of the power transistor 48, and a second conduction terminal 62 is connected to a node 64 between the first resistance 54 and the second conduction terminal 56 of the power transistor 48. A driving current Id is the driving current for the power transistor 48.

A second resistance 68 having a first terminal 70 is connected to the node 64 between the first resistance 54 and the second conduction terminal 56 of the power transistor 48. As will be discussed in greater detail below, the second resistance 68 is balanced with the first resistance 54 in terms of respective temperature coefficients so that the output current Iout of the voltage regulator 40 is not sensitive to temperature variations. Moreover, the second resistance 68 has a low resistance requirement. This advantageously allows power dissipation by the first resistance 54 to be relatively small, as will also be described in greater detail below.

A first transistor 72 and a second transistor 74 having respective control terminals 76, 78 are connected together. The first transistor 72 has a first conduction terminal 80 connected to the first voltage reference Vcc via a third transistor 82, and a second conduction terminal 79 is connected to the output terminal 46 of the voltage regulator 40.

The second transistor 74 has a first conduction terminal 86 connected to the first voltage reference Vcc via a fourth transistor 90. The first conduction terminal 86 of the second transistor 74 is also connected to the control terminal 92 of the limit switch transistor 58. A second conduction terminal 77 of the second transistor is connected to a second terminal 94 of the second resistance 68.

The current limit protection circuit 42 further includes a fifth transistor 100 having a first conduction terminal 102 connected to the second voltage reference Vcc, and a second conduction terminal 104 connected to a second current source 106 providing current I1. A control terminal 108 of the fifth transistor 100 is connected to the control terminals 110, 112 of the third and fourth transistors 82, 90. In addition, the fifth transistor 100 is configured as a diode by connecting the control terminal 108 to its second conduction terminal 104.

More specifically, the third and fourth transistors 82, 90 are configured as a current mirror for mirroring current I1, whereas the first and second transistors 72, 74 are the active loads for the third and fourth transistors 82, 90. The third and fourth transistors 82, 90 respectively provide operation current I2 and I3 based upon current I1. The third transistor 82 and the fourth transistor 90 each preferably comprises a PNP bipolar transistor.

The first transistor 72, the second transistor 74 and the power transistor 48 each preferably comprises an NPN bipolar transistor. The second conduction terminal 79 of the first transistor 72 defines an emitter having a first area, and the second conduction terminal 77 of the second transistor 74 defines an emitter having a second area preferably equal to the first area. The first and second transistors 72, 74 thus have the same emitter area so that respective control voltages have the same variation with temperature.

The first resistance 54 preferably has a temperature coefficient less than a temperature coefficient of the second resistance 68. More particularly, the temperature coefficient for the second resistance 68 is based upon the temperature coefficient for the first resistance 54 so that the output current Iout is not sensitive to temperature variations. In other words, the second resistance 68 is selected so that a desired temperature coefficient is balanced with respect to the temperature coefficient of the first resistance 54. This advantageously allows the voltage regulator 40 to have a maximum output current that is not sensitive to temperature variations.

The current limit protection circuit 42 is thus formed by the limit switch transistor 58, the first through the fifth transistors 72, 74, 82, 90 and 100, the first resistance 54 and the second resistance 68. As stated above, current I0 is a source current for currents I1 and I2. Current Ib is the bias current for the power transistor 48.

As previously stated, if the area of the second conduction terminal 77 of the second transistor 74 is equal to A1, then the area of the second conduction terminal 79 of the first transistor 72 is also equal to A1. Under normal condition current I2 flows through the second transistor 74 only and no current is flowing into the control terminal 92 of the limit switch transistor 58. Hence, the limit switch transistor 58 is off.

When the output current Iout increases to a certain threshold, some portion of current I2 will divert to the control terminal 92 of the limit switch transistor 58 and turn it on. Consequently, the limit switch transistor 58 reduces the driving current Id to the control terminal 50 of the power transistor 48 for protection thereof.

Figure 1:
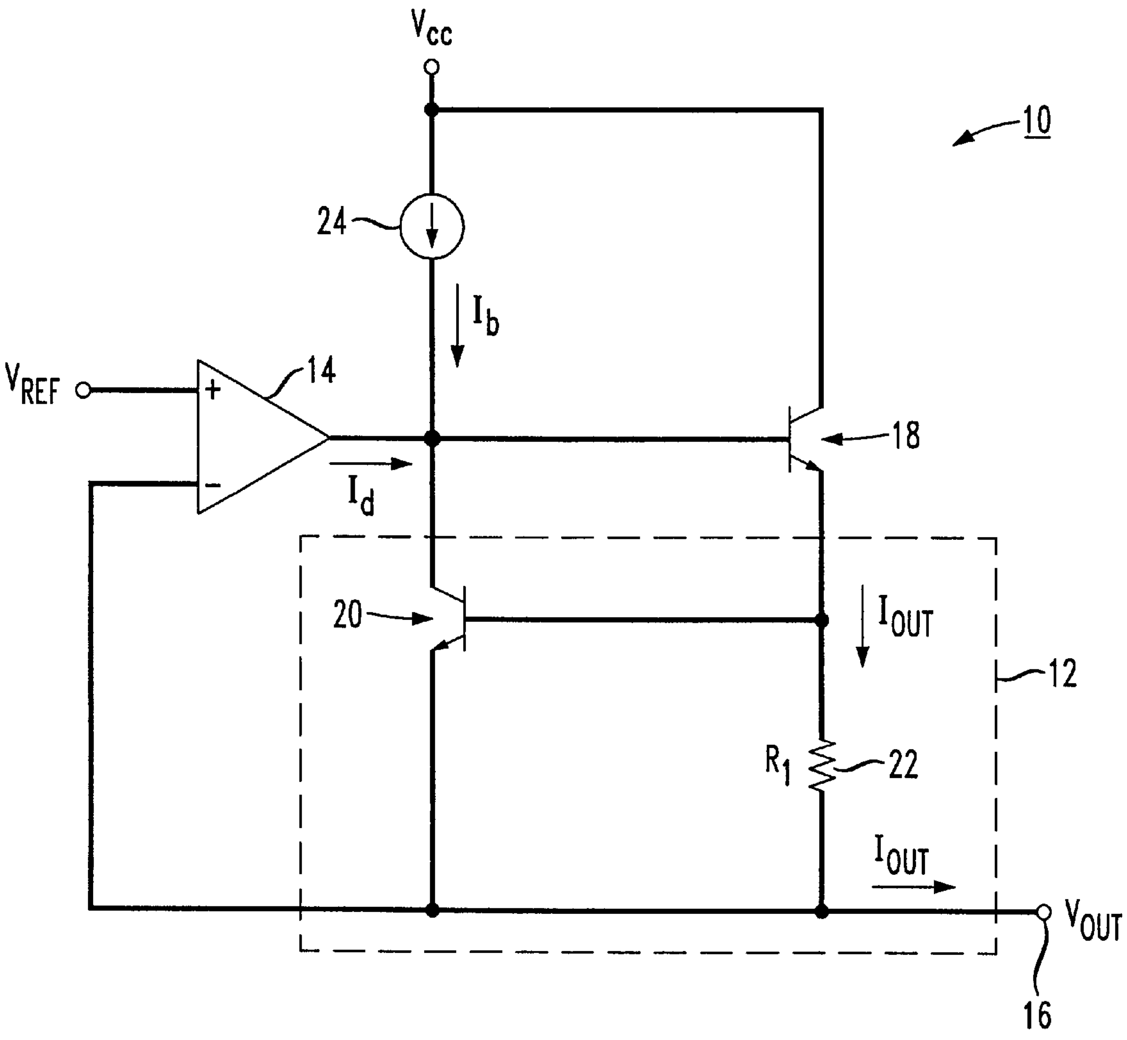
FIG. 1 PRIOR ART
FIG. 1 is a schematic diagram of a current limit protection circuit for a voltage regulator in accordance with the prior art.

Assuming that the second conduction terminal area of the third transistor 82 is A times the second conduction terminal area of the fourth transistor 90, then current II=A*I2. Referring again to FIG. 1, the voltage measurements within loop A is as follows:

$$(Iout \times R1)+(I2 \times R2)+Vbe_{74}=Vbe_{72} \quad (1)$$

Since $Vbe_{72}$=Vtln(I1/Is3), $Vbe_{74}$=Vtln(I2/Is4), I1=A*I2, and Is3=Is4, substitution may be made into equation (1) to provide the following equation:

$$Vbe3 = Vt\ln\frac{I1}{Is3}$$

$$Vbe4 = Vt\ln\frac{I2}{Is4}$$

$$I1 = A \times I2$$

$$Is3 = Is4$$

Substituting them into equation (1), one gets $$Iout = \frac{Vt\ln A - I2 \times R2}{R1} \quad (2)$$

$$R1 = \frac{Vt\ln A - I2 \times R2}{I0} \quad (3)$$

When Vt is the thermal voltage, Vt=26 mV. Current Is is the reverse saturation current of the transistor. As an illustration, let current Iout=1 amp, A=5, current I2=10 microamps, and the second resistance, (R2) 68=2,000 ohms.

Then from equation (3), the first resistance (R1) 54 has a resistance of 21.8 milliohms. Therefore, the resistance of first resistance 54 is relatively insignificant, and the power dissipation is negligible. The first resistance 54 may be a metal resistor, as readily appreciated by one skilled in the art.

To eliminate the temperature sensitivity of the voltage regulator 40, the temperature coefficient (Tcf) effect of Vt, the first resistance 54 and the second resistance 68 must be balanced. Normally, the temperature coefficient Tcf of the thermal voltage Vt and the first resistance 54 are 3300 ppm/° C. and 4000 ppm/° C., respectively. Therefore, selection of the second resistance 68 has a significant impact on the performance of the voltage regulator 40.

For example, let Tcft, Tcf1, Tcf2 be the respective temperature coefficients of the thermal voltage Vt, the first resistance 54, and the second resistance 68. The temperature variation of temperature is ΔT and the maximum output current at temperature T+ΔT is Iout'. From the equation (2), the following equation is obtained:

$$Iout' = \frac{(1 + Tcft \cdot \Delta T)Vt\ln A - I2 \times (1 + Tcf2 \cdot \Delta T)R2}{(1 + Tcf1 \cdot \Delta T)R1} \quad (4)$$

With ΔIout=Iout'−Iout, and by setting ΔIout=0, then the following equation is obtained:

$$(1+Tcft \cdot \Delta T)Vt\ln A - I2 \times (1+Tcft2 \cdot \Delta T) \times R2 = (1+Tcf1 \cdot \Delta T)(Vt\ln A - I2 \times R2) \quad (5)$$

Figure 3:
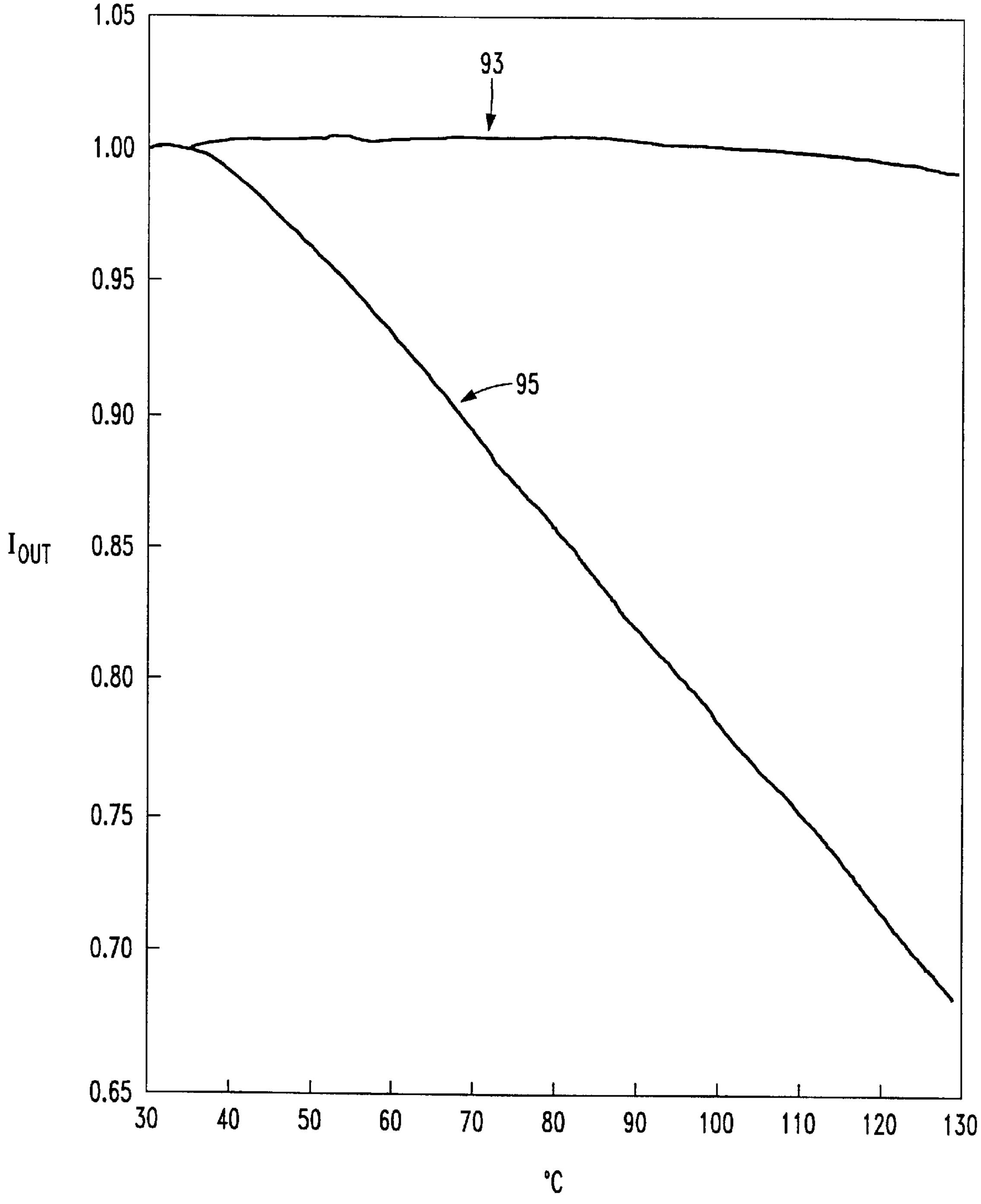
FIG. 3 is a graph illustrating output current from the voltage regulator in accordance with the present invention based upon temperature variations.

If equation (5) is met, then Iout'=Iout, and Iout will be insensitive to temperature, as best shown by plots 93 and 95 illustrated in FIG. 3. Plot 93 represents the output current Iout for the voltage regulator 40 as described herein, whereas plot 95 represents variation of the output current Iout for the prior art voltage regulator 10 illustrated in FIG. 1. From equation (5), $$Vt \times \ln A \times (Tcf1 - Tcft) = I2 \times R2 \times (Tcf1 - Tcf2) \quad (6)$$

Assume that A=5, current I2=10 $\mu$A, the second resistance (R2) 68=2,000 ohms, the thermal voltage Vt=26 mV, Tcf1=4000 ppm/° C., and Tcft=3300 ppm/° C. Substituting these parameters into equation (6), one obtains Tcf2=2544 ppm/° C. The second resistance 68 thus has a Tcf of about 2544 ppm/° C. An implant resistor has a very similar temperature coefficient.

Figure 4:
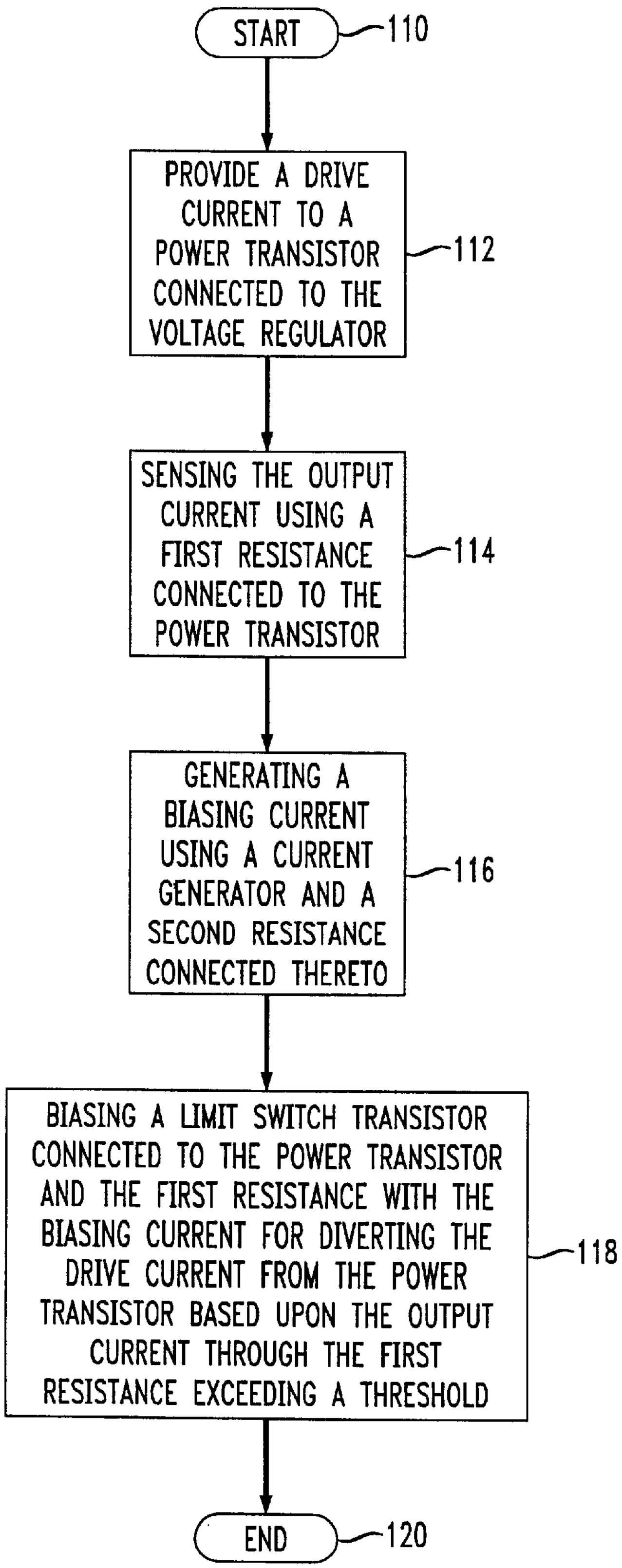
FIG. 4 is a flow chart illustrating a method for limiting output current from a voltage regulator in accordance with the present invention.

Another aspect of the invention relates to a method for limiting output current Iout from a voltage regulator 40. Referring to FIG. 4, from the start (Block 110), the method includes providing a drive current Id to a power transistor 48 connected to the voltage regulator at Block 112, sensing the output current Iout using a first resistance 54 connected to the power transistor at Block 114, and generating a biasing current using a current generator and a second resistance 68 connected thereto at Block 116.

The method preferably further comprises at Block 118 biasing a limit switch transistor 58 connected to the power transistor 48 and the first resistance 54 with the biasing current for diverting the drive current Id from the power transistor based upon the output current Iout through the first resistance 54 exceeding a threshold. The method is complete at Block 120.

The first resistance 54 has a value less than a value of the second resistance 68. Accordingly, the first resistance 54 can advantageously be made considerably smaller than otherwise to thereby reduce power consumption. The first resistance 54 preferably has a temperature coefficient less than a temperature coefficient of the second resistance 69 so that the output current Iout is not sensitive to temperature variations.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A voltage regulator comprising:

a power transistor receiving a drive current; and a current limit protection circuit connected to said power transistor and comprising a first resistance connected to said power transistor for sensing an output current, a limit switch transistor connected to said power transistor and to said first resistance, and a current generator and second resistance connected thereto for biasing said limit switch transistor to divert drive current from said power transistor based upon the output current through said first resistance exceeding a threshold.

2. A voltage regulator according to claim 1 wherein said first resistance has a value less than a value of said second resistance.

3. A voltage regulator according to claim 1 wherein said first resistance has a temperature coefficient less than a temperature coefficient of said second resistance.

4. A voltage regulator according to claim 3 wherein the temperature coefficient for said second resistance is based upon the temperature coefficient for the first temperature coefficient so that the output current is not sensitive to temperature variations.

5. A voltage regulator according to claim 1 wherein said current generator comprises:

a current source; and at least one transistor connected to said current source.

6. A voltage regulator according to claim 5 wherein said at least one transistor comprises:

a first transistor having a first conduction terminal connected to a first voltage reference, and a second conduction terminal connected to said first resistance; and a second transistor having a control terminal connected to a control terminal of said first transistor, and a first conduction terminal connected to the first voltage reference and to a control terminal of said limit switch transistor, and a second conduction terminal connected to said second resistance.

7. A voltage regulator according to claim 6 wherein said first transistor, said second transistor and said power transistor each comprises an NPN bipolar transistor.

8. A voltage regulator according to claim 7 wherein the second conduction terminal of said first transistor defines an emitter having a first area, and the second conduction terminal of said second transistor defines an emitter having a second area equal to the first area.

9. A voltage regulator according to claim 6 wherein the control terminal and the first conduction terminal of said first transistor are connected together.

10. A voltage regulator according to claim 6 further comprising:

a third transistor having a first conduction terminal connected to the first voltage reference, and a second conduction terminal connected to the first conduction terminal of said first transistor; and a fourth transistor having a control terminal connected to a control terminal of said third transistor, and a first conduction terminal connected to the first voltage reference, and a second conduction terminal connected to the first conduction terminal of said second transistor.

11. A voltage regulator according to claim 10 wherein said third transistor and said fourth transistor each comprises a PNP bipolar transistor.

12. A voltage regulator according to claim 10 further comprising a fifth transistor having a control terminal connected to the control terminal of said third transistor, a first conduction terminal connected to the first voltage reference, and a second control terminal connected to said current source.

13. A voltage regulator according to claim 1 further comprising an error amplifier connected to said power transistor.

14. A voltage regulator comprising:

an output terminal;

an error amplifier having an input connected to the output terminal, and an output providing a drive current;

a power transistor connected to the output of said error amplifier for receiving the drive current; and a current limit protection circuit connected to said power transistor and comprising a first resistance connected to said power transistor for sensing an output current, a limit switch transistor connected to said power transistor and to said first resistance, and a current generator and second resistance connected thereto for biasing said limit switch transistor to divert drive current from said power transistor based upon the output current through said first resistance exceeding a threshold, and said first resistance having a value less than a value of said second resistance.

15. A voltage regulator according to claim 14 wherein said first resistance has a temperature coefficient less than a temperature coefficient of said second resistance.

16. A voltage regulator according to claim 15 wherein the temperature coefficient for said second resistance is based upon the temperature coefficient for the first temperature coefficient so that the output current is not sensitive to temperature variations.

17. A voltage regulator according to claim 14 wherein said current generator comprises:

a current source; and at least one transistor connected to said current source.

18. A voltage regulator according to claim 17 wherein said at least one transistor comprises:

a first transistor having a first conduction terminal connected to a first voltage reference, and a second conduction terminal connected to said first resistance; and a second transistor having a control terminal connected to a control terminal of said first transistor, and a first conduction terminal connected to the first voltage reference and to a control terminal of said limit switch transistor, and a second conduction terminal connected to said second resistance.

19. A voltage regulator according to claim 18 wherein said first transistor, said second transistor and said power transistor each comprises an NPN bipolar transistor.

20. A voltage regulator according to claim 19 wherein the second conduction terminal of said first transistor defines an emitter having a first area, and the second conduction terminal of said second transistor defines an emitter having a second area equal to the first area.

21. A voltage regulator according to claim 18 wherein the control terminal and the first conduction terminal of said first transistor are connected together.

22. A voltage regulator according to claim 18 further comprising:

a third transistor having a first conduction terminal connected to the first voltage reference, and a second conduction terminal connected to the first conduction terminal of said first transistor; and a fourth transistor having a control terminal connected to a control terminal of said third transistor, and a first conduction terminal connected to the first voltage reference, and a second conduction terminal connected to the first conduction terminal of said second transistor.

23. A voltage regulator according to claim 22 wherein said third transistor and said fourth transistor each comprises a PNP bipolar transistor.

24. A voltage regulator according to claim 22 further comprising a fifth transistor having a control terminal connected to the control terminal of said third transistor, a first conduction terminal connected to the first voltage reference, and a second control terminal connected to said current source.

25. A voltage regulator comprising:

an NPN bipolar power transistor receiving a drive current; and a current limit protection circuit connected to said NPN bipolar power transistor and comprising a first resistance connected to said NPN bipolar power transistor for sensing an output current, an NPN bipolar limit switch transistor connected to said NPN bipolar power transistor and to said first resistance, a current source and at least one NPN transistor connected thereto for generating a biasing current for biasing said NPN bipolar limit switch transistor, and a second resistance connected to said at least one NPN bipolar transistor and said first resistance so that biasing of said NPN bipolar limit switch transistor diverts drive current from said NPN bipolar power transistor based upon the output current through said first resistance exceeding a threshold.

26. A voltage regulator according to claim 25 wherein said first resistance has a value less than a value of said second resistance.

27. A voltage regulator according to claim 25 wherein said first resistance has a temperature coefficient less than a temperature coefficient of said second resistance.

28. A voltage regulator according to claim 27 wherein the temperature coefficient for said second resistance is based upon the temperature coefficient for the first temperature coefficient so that the output current is not sensitive to temperature variations.

29. A voltage regulator according to claim 25 wherein said at least one NPN bipolar transistor comprises:

a first NPN bipolar transistor comprising a base, a collector connected to a first voltage reference, and an emitter connected to said first resistance; and a second NPN bipolar transistor comprising a base connected to the base of said first NPN bipolar transistor, a collector connected to the first voltage reference and to a base of said NPN bipolar limit switch transistor, and an emitter connected to said second resistance.

30. A voltage regulator according to claim 29 wherein the emitter of said first NPN bipolar transistor has a first area, and the emitter of said second NPN bipolar transistor has a second area equal to the first area.

31. A voltage regulator according to claim 29 wherein the base and the collector of said first NPN bipolar transistor are connected together.

32. A voltage regulator according to claim 29 further comprising:

a third PNP bipolar transistor comprising a base, an emitter connected to the first voltage reference, and a collector connected to the collector of said first NPN bipolar transistor; and a fourth PNP bipolar transistor comprising a base connected to the base of said third PNP bipolar transistor, an emitter connected to the first voltage reference, and a collector connected to the collector of said second NPN bipolar transistor.

33. A voltage regulator according to claim 32 further comprising a fifth PNP bipolar transistor comprising a base connected to the base of said third PNP bipolar transistor, an emitter connected to the first voltage reference, and a collector connected to said current source.

34. A method for limiting output current from a voltage regulator comprising:

providing a drive current to a power transistor connected to the voltage regulator;

sensing the output current using a first resistance connected to the power transistor;

generating a biasing current using a current generator and a second resistance connected thereto; and biasing a limit switch transistor connected to the power transistor and the first resistance with the biasing current for diverting the drive current from the power transistor based upon the output current through the first resistance exceeding a threshold.

35. A method according to claim 34 wherein the first resistance has a value less than a value of the second resistance.

36. A method according to claim 34 wherein the first resistance has a temperature coefficient less than a temperature coefficient of the second resistance.

37. A method according to claim 36 wherein the temperature coefficient for said second resistance is based upon the temperature coefficient for the first temperature coefficient so that the output current is not sensitive to temperature variations.

38. A method according to claim 34 wherein the current generator comprises:

a current source; and at least one transistor connected to the current source.

39. A method according to claim 38 wherein the at least one transistor comprises:

a first transistor having a first conduction terminal connected to a first voltage reference, and a second conduction terminal connected to the first resistance; and a second transistor having a control terminal connected to a control terminal of the first transistor, and a first conduction terminal connected to the first voltage reference and to a control terminal of the limit switch transistor, and a second conduction terminal connected to the second resistance.

40. A method regulator according to claim 39 wherein the first transistor, the second transistor and the power transistor each comprises an NPN bipolar transistor.

41. A method according to claim 39 wherein the second conduction terminal of the first transistor defines an emitter having a first area, and the second conduction terminal of the second transistor defines an emitter having a second area equal to the first area.

42. A method according to claim 39 wherein generating the drive current is based upon comparing a desired output voltage of the voltage regulator to an actual output voltage.

* * * * *